(12) United States Patent
Muramatsu

(10) Patent No.: US 6,392,718 B1
(45) Date of Patent: May 21, 2002

(54) DEVICE AND METHOD FOR PREVENTING FLICKER

(75) Inventor: Koji Muramatsu, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/408,168

(22) Filed: Sep. 29, 1999

(30) Foreign Application Priority Data

Sep. 30, 1998 (JP) .......................................... 10-278676

(51) Int. Cl.[7] .............................................. H04N 11/20
(52) U.S. Cl. ...................... 348/910; 348/607; 348/447; 348/624
(58) Field of Search ................................. 348/624, 447, 348/607, 618, 619, 910; 382/248, 250, 264; 345/94, 95, 96, 97, 98, 99, 100; H04N 11/20, 5/21, 5/213, 5/217

(56) References Cited

U.S. PATENT DOCUMENTS

| | | | | |
|---|---|---|---|---|
| 5,485,533 A | * | 1/1996 | Hatano et al. | 382/236 |
| 5,822,008 A | * | 10/1998 | Inoue et al. | 348/446 |
| 5,892,551 A | * | 4/1999 | Uematsu | 348/447 |
| 5,936,675 A | * | 8/1999 | Zhang et al. | 348/446 |
| 6,067,120 A | * | 5/2000 | Horikawa et al. | 348/447 |
| 6,172,718 B1 | * | 1/2001 | Alvarez et al. | 348/625 |
| 6,307,971 B1 | * | 10/2001 | Persiantsev et al. | 382/236 |

* cited by examiner

Primary Examiner—John W. Miller
Assistant Examiner—Trang U. Tran
(74) Attorney, Agent, or Firm—Finnegan, Henderson, Farabow, Garrett & Dunner, L.L.P.

(57) ABSTRACT

A device and method for preventing flicker that occurs while displaying image data by attenuating a high-frequency portion of orthogonal transformed color signals of the image data. The present invention is also directed to a computer-readable recording medium on which a program for flicker prevention is recorded.

23 Claims, 2 Drawing Sheets

DEVICE AND METHOD FOR PREVENTING FLICKER

BACKGROUND OF THE INVENTION

1. Field of the Invention

The present invention relates to a device and method for preventing flicker that occurs while displaying image data and a computer-readable recording medium on which a program for flicker prevention is recorded.

2. Description of the Related Art

In display devices such as television receivers and computer monitors, image data is displayed according to an interlace scheme. The interlace scheme is a technique of alternately displaying odd numbered scanning lines and even-numbered horizontal scanning lines to display moving image data smoothly. The interlace scheme is used when a client computer receives image data stored in a World Wide Web server (hereinafter referred to as "Web server") and displays it on such a display device.

However, flicker may occur when image data having strong color contrast or clear color boundaries, such as an artificially generated image data, is displayed according to the interlace scheme. An example of image data having clear color boundaries is artificially generated image data with a horizontally extending line having a width of one pixel. For example, where the interlace scheme is employed, this line appears only during the display of odd-numbered scanning lines. When displaying even-numbered scanning lines, the line will not appear. (And vice versa). This line is displayed in a flashing state and hence may cause a flicker.

Conventionally, to avoid such a flicker phenomenon, image data to be displayed may be limited to natural image data lack distinct color boundaries and are relatively weak in color contrast. Another conventional method is to subject image data in advance to, for example, a process of creating a gradient color boundaries and supply resulting image data to the display.

As described above, conventionally, image data to be displayed are restricted or color boundaries of image data are created a gradient color boundaries in advance to prevent flicker.

However, the following problems will occur if the above conventional flicker preventing methods are applied to a system of displaying an arbitrary image stored in a Web server using browser software in a client.

First, there may occur a case that image data stored in a Web server has not been subjected in advance to a process of creating a gradient color boundaries, in which case image data is displayed that may cause a flicker.

Second, even if image data stored in a Web server has been subjected in advance to a process of shading off color boundaries, the process may not be suitable for the client because the display device and environment vary from one client to another. In this case, there is a problem that the user on the client cannot make a correction because the process of shading off color boundaries is performed on the server.

SUMMARY OF THE INVENTION

Accordingly, the present invention is directed to a device and method for preventing flicker that substantially obviates one or more of the problems due to limitations and disadvantages of the related art.

In accordance with the purpose of the present invention, as embodied and broadly described, the present invention is directed to a device for preventing flicker which occurs when displaying image data. The device comprises a first converter, an orthogonal transforming unit, and a second attenuating unit, an inverse orthogonal transforming unit, and a second converter. The first converter converts image data into a first set of signals having at least one luminance signal and two color difference signals. The orthogonal transforming unit orthogonal transforms the first set of signals. The high-frequency attenuating unit attenuates a high-frequency portion of at least one of the orthogonal transformed signals. The inverse orthogonal transforming unit inverse orthogonal transforms the high-frequency attenuated set of signals into a second set of signals having at least one luminance signal and two color difference signals. The second converter converts the resultant second set of signals into image data for display.

Also in accordance with the present invention, there is provided a method for preventing flicker that occurs when displaying image data. The method comprises the steps of converting image data into a first set of signals having at least one luminance signal and two color difference signals, orthogonal transforming the first set of signals, attenuating a high-frequency portion of at least one of the orthogonal transformed signals, inverse orthogonal transforming the high-frequency attenuated set of signals into a second set of signals having at least one luminance signal and two color difference signals, and converting the resultant second set of signals into image data for display.

Also in accordance with the present invention, there is provided a computer-readable memory with instruction means for preventing flicker. The computer-readable memory comprises instruction means for causing a computer to convert image data into a first set of signals having at least one luminance signal and two color difference signals, instruction means for causing a computer to orthogonal transform the first set of signals, instruction means for causing a computer to attenuate a high-frequency portion of at least one of the orthogonal transformed signals, instruction means for causing a computer to inverse orthogonal transform the high-frequency attenuated set of signals into a second set of signals having at least one luminance signal and two color difference signals, and instruction means for causing a computer to convert the resultant second set of signals into image data for display.

DETAILED DESCRIPTION OF THE PREFERRED EMBODIMENT

An embodiment of the present invention will be hereinafter described with reference to the accompanying drawings. This embodiment is directed to a flicker preventing section that performs real-time data conversion on received digital image data for flicker prevention. The image data conversion for flicker prevention employs a technique that uses an orthogonal transform. The flicker preventing section is provided on the image data receiving device.

Figure 1:
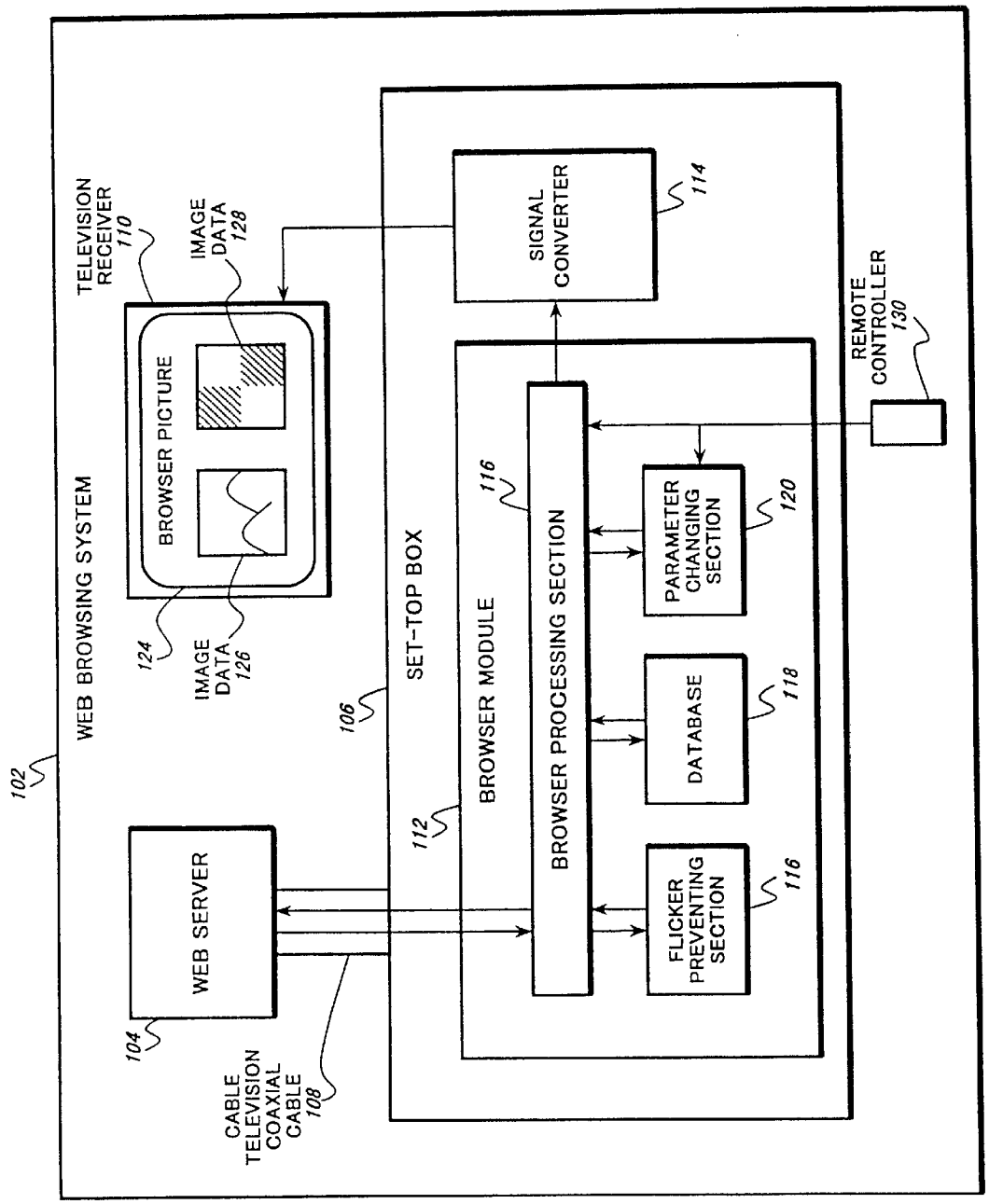
FIG. 1 is a block diagram showing the configuration of a Web browsing system that is equipped with a flicker preventing section according to an embodiment of the present invention.

FIG. 1 is a block diagram showing the configuration of a Web browsing system 102 that is equipped with a flicker preventing section according to the embodiment.

The Web browsing system 102 is connected to a Web server 104 via a set-top box 106 and a cable television coaxial cable 108 so as to be able to transmit and receive data to and from the Web server 104. An image is displayed on a television receiver 110 based on a signal that is supplied from the set-top box 106. Holding a plurality of hyper text markup language (HTML) data and image data, the Web server 104 transmits data in response to a request from the set-top box 106. Image data held by the Web server 104 may be still image data and/or moving image data.

The set-top box 106 is composed of a browser module 112 and a signal converter 114. The set-top box 106 receives HTML data and image data via the cable television coaxial cable 108, generates screen data based on the received data, converts it to national television system committee (NTSC) signal, and outputs it to the television receiver 110.

The browser module 112 generates a Web page by using the received HTML data and image data and outputs screen data to the signal converter 114 in the form of RGB signals. The term "RGB" means a color as a combination of three colors of R (red), G (green), and B (blue). The browser module 112 is composed of a browser processing section 116 having browser basic functions such as those available in Netscape Navigator or Microsoft Explorer, a database 118, a parameter changing section 120, and a flicker preventing section 122.

After receiving an instruction from the user, the browser processing section 116 requests, according to the instruction, the Web server 104 to transmit data. The browser processing section 116 interprets received HTML data. If an HTML code representing image data, e.g., <img src="ABC.jpg">, is included, the browser refers to database 118 and acquires various parameters that are stored there in association with the received image data. When no parameters are associated with the received image data, the browser processing section 116 acquires default values as parameters.

The browser processing section 116 outputs the received image data and the parameters read out from the database 118 to the flicker preventing section 122, and receives image data for display that has been subjected to a flicker preventing process. The browser processing section 116 then generates a Web page and outputs its image data to the signal converter 114 in the form of RGB signals.

The browser processing section 116 stores, in the database 118, the image data for display that has been received from the flicker preventing section 122. When parameters in the database 118 have been changed, the browser processing section 116 reads out the changed parameters and the image data for display from the database 118, outputs those to the flicker preventing section 122, and receives new image data for display. The new image data for display is subjected to the same process as the above-described process that was executed on the previous image data for display.

The database 118 stores parameters that are correlated with image data and default values to be used when no parameters are specified. The database 118 also stores image data for display that has been generated by the flicker preventing section 122 and is supplied via the browser processing section 116.

The parameter changing section 120 reads out parameters that are currently set or default values from the database 118 and presents those to the user. The parameter changing section 10 records, in the database 118, parameters that have been newly set or changed through parameters provided by a user.

The flicker preventing section 122 receives image data and parameters from the browser processing section 112, performs an image conversion for flicker prevention on the image data by using the parameters, and outputs converted image data to the browser processing section 116 as image data for display.

The signal converter 114 converts RGB signals that are received from the browser module 112 to an NTSC signal and outputs it to the television receiver 110.

The television receiver 110 receives an NTSC signal from the set-top box 106 and displays an image based on the received NTSC signal. In the example of FIG. 1, a browser picture 124 generated by the browser module 112 is displayed on the screen and image data 126 and 128 are displayed in the browser picture 124.

Figure 2:
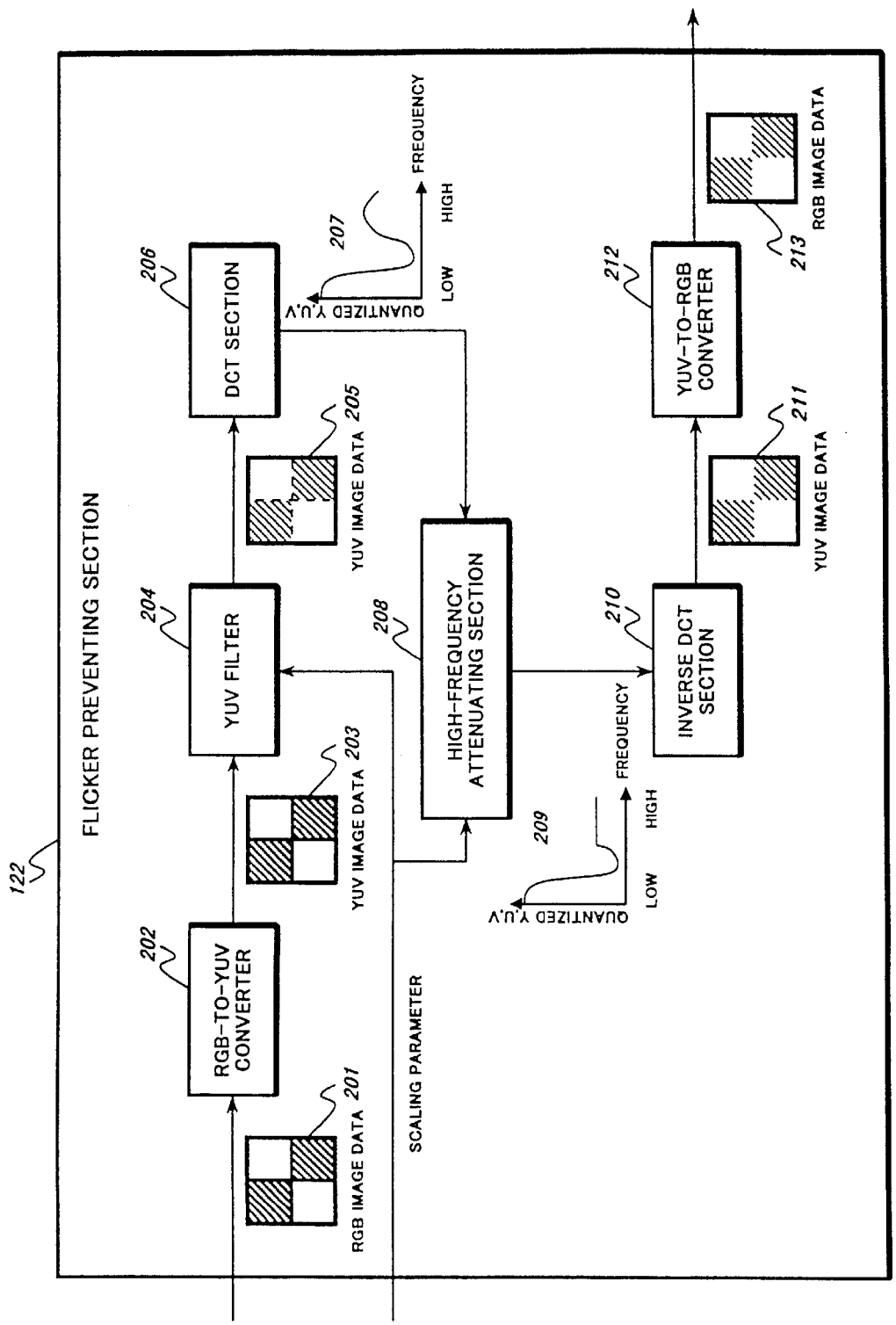
FIG. 2 is a block diagram showing the configuration of the flicker preventing section according to the embodiment.

FIG.2 is a block diagram showing the configuration of the flicker preventing section 122 according to the embodiment.

As described above, the flicker preventing section 122 receives RGB image data and various parameters, executes the flicker preventing process on the image data by using the parameters, and outputs resulting RGB image data for display. In the flicker preventing section 122, an RGB-to-YUV converter 202 receives image data 201 in which each dot representing image data is expressed according to the RGB scheme and performs, for each dot, conversion from the RGB scheme to a luminance component (Y) and two color difference components (U, V), that is, to a luminance signal and two color difference signals. The luminance signal and the two color difference signals are output to a YUV filter 204 as YUV image data 203.

The YUV filter 204 performs filtering by multiplying luminance values (Y) and color difference values (U, V) of the respective dots that are input from the RGB-to-YUV converter 202 by scaling parameters. For example, if the scaling parameter for luminance is 0.9, luminance values of the respective dots are also multiplied by 0.9. Similarly, if the scaling parameters for color differences (U, V) are 0.8, color difference values (U, V) of the respective dots are multiplied by 0.8. The YUV filter 204 outputs in the form of a filtered luminance component (Y) and color difference components (U, V) to a discrete cosine transform (DCT) section 206 YUV image data 205.

The DCT section 206 performs an orthogonal transform on the filtered luminance component (Y) and color difference components (U, V) that are input from the YUV filter 204. The image data that has been obtained by converting RGB image data to a luminance component (Y) and color difference components (U, V) and filtering those components is separated by the DCT into high image frequency portions and low image frequency portions. Then, the DCT section 206 outputs image frequency separation results of each of the luminance component (Y) and the color difference components (U, V) to a high-frequency attenuating section 208 as frequency separation data, having a distribution character shown in a map 207, respectively.

The high-frequency attenuating section 208 attenuates the absolute values of the high image frequency portions of the frequency separation data of each of the luminance component (Y) and the color difference components (U, V) that are input from the DCT section 206 by using high-frequency attenuating parameters that are set for the respective components, and outputs resulting data, having a distribution character shown in a map 200, to an inverse DCT section 210.

Receiving the high-frequency-component-attenuated frequency separation data of the respective components from the high-frequency attenuating section 208, the inverse DCT section 210 performs inverse DCT on those data and obtains YUV image data 211. Each dot in the data is represented by a luminance value (Y) and color difference values (U, V). The YUV image data 211 is output to a YUV-to-RGB converter 212.

The YUV-to-RGB converter 212 converts the YUV image data to RGB image data 213 on a dot-by-dot basis and outputs the latter as image data for display.

The operation of the Web browsing system 102 equipped with the flicker preventing section 122 having the above configuration will be described in such a manner as to be divided into a first operation of displaying a home page and a second operation of setting parameters in the database 118.

The first operation of displaying a home page designated by the user will be described. When displaying a home page, first, the user causes the browser module 112 of the set-top box 106 to operate, whereby access is made to the Web server 104. As a result, HTML data designated by the user is transmitted from the Web server 104 to the set-top box 106. The HTML data received by the set-top box 106 is interpreted by the browser processing section 116 of the browser module 112 and, if necessary, image data is downloaded from the Web server 104. The downloaded image data is output from the browser processing section 116 to the flicker preventing section 122, and various parameters to be used in processing the image data are retrieved from the database 118 and output to the flicker preventing section 122.

In the flicker preventing section 122, first, the image data 201 according to the RGB scheme is converted by the RGB-to-YUV converter 202 to image data 203 according to the YUV scheme, which is output to the YUV filter 204.

Filtering is performed in the YUV filter 204 in such a manner that luminance values (Y) and color difference values (U, V) of respective dots are multiplied by, for example, the same scaling parameters that are set in the YUV filter 204. The filtering process is executed to prevent the flicker by darkening the image data and making it lighter in color as a whole.

The YUV image data after the filtering are subjected to DCT for each of the three components (Y, U, and V) in the DCT section 206, and resulting data is output to the high-frequency attenuating section 208. The YUV image data that has been subjected to DCT is then divided into high image frequency portions and low image frequency portions. High-frequency portions of the Y component of the frequency separation data generated by the DCT represent portions having clear differences in luminance. Low-frequency portions represent portions where the difference in luminance is indistinct. On the other hand, high-frequency portions of each of the U and V components represent fine pattern portions and low-frequency portions represent coarse pattern portions.

In the high-frequency attenuating section 208, the absolute values of the high-frequency portions of the luminance component (Y) and the color difference components (U, V) of the image data that has been subjected to DCT are decreased by using high-frequency attenuating parameters that are set for the respective components. The high-frequency attenuating process of the high-frequency attenuating section 208 is executed to prevent a flicker by making the image data less distinct and coarser.

Image data that has been obtained by the high-frequency attenuating process is then converted to YUV image data 211 in the inverse DCT section 210. As a result of the execution of the high-frequency attenuating process, the resulting image data 211 has color boundaries that are less distinct and weaker in color contrast. The YUV image data 211 produced by the inverse DCT section 210 is then converted by the YUV-to-RGB converter 212 to RGB image data 213, which is output to the browser processing section 116 as image data for display.

In the browser module 112, the flicker preventing section 122 executes the above-described flicker preventing process, for example, every time image data is received from the Web server 104, whereby image data for display is obtained. The image data for display and the parameters (i.e., the scaling parameters and the high-frequency attenuating parameters for luminance and two color differences) that were used in producing the image data for display are correlated with each other by the browser processing section 116 and stored in the database 118.

RGB image data is generated by the browser processing section 116 by using the HTML data that was interpreted previously by the browser processing section 116 and the image data for display that has been produced by the flicker preventing section 122, and output to the signal converter 114.

The RGB image data is converted by the signal converter 114 to an NTSC signal, which is output to the television receiver 110. In the television receiver 110, a browser picture 124 is displayed by using the received NTSC signal.

Next, the second operation of setting parameters in the database 118 according to the user's instructions will be described.

Since the parameter changing section 120 has a graphical user interface (GUI) function, the user can easily manipulate the parameter changing section 120 by using it. First, the user causes the parameter setting status of the database 118 to be displayed by using the GUI function of the parameter changing section 120 and recognizes it.

The parameter changing section 120 allows setting of parameters that can be applied to all image data received as well as setting of parameters for each image received. Further, default values to be used for image data for which no parameters are set have been set in the database 118 at the time of shipment of the product concerned. The default values can also be changed or re-set like the above parameters.

For example, assume a case that the user perceives that image data 128 being displayed is flickering and he has selected the image data 128 by using a selection button on a remote controller. In response, parameters that were used last in executing a flickering process on the image data 128 are read out from the database 118 to the parameter changing section 120 and displayed.

The scaling parameters are varied, for example, if the user depresses an up/down button on the remote controller, and the high-frequency attenuating parameters are varied if the user depresses a right/left button thereon. If the user again depresses the selection button on the remote controller 130, the parameter values at the time of depression of the selection button are correlated, as new scaling parameters and high-frequency attenuating parameters, with the image data 128 and stored in the database 118.

When the parameters for image data being displayed has been changed as in the case of the above image data 128, a flicker preventing process is executed on the image data being displayed by using the new parameters and resulting image data is displayed on the television receiver 110. The user causes the flicker preventing process to be executed repeatedly on the image data being displayed until he becomes satisfied with resulting image data.

As described above, in the Web browsing system 102, the flicking preventing section 122 according to the embodiment that attenuates high image frequency portions of image data that has been obtained by DCT is provided in the set-top box 106 as a receiving device. The DCT is a technique used in data compression etc. By using the DCT also for flicker prevention, the hardware and software resources of the receiving device can be utilized efficiently.

A flicker tends to occur when image data has strong color contrast and clear color boundaries. In this embodiment, the luminance difference of image data is made coarser and less distinct by attenuating high image frequency portions of the data after application of the DCT. This makes it possible to prevent a flicker that may occur when displaying image data.

In this embodiment, in addition to the flicker preventing process using DCT, the YUV filter 204 modifies the color contrast to prevent a flicker. This makes it possible to prevent a flicker more properly.

In the embodiment, since the flicker preventing process is executed on a real-time basis on receiving device, each receiving device can execute a flicker preventing process that is suitable for its device type, the display state, the display environment, or the user's taste. Since the flicker preventing process is executed by the receiving device, a flicker can be prevented even if the Web server 104 holds image data that causes a flicker. Since the flicker preventing process is executed on a real-time basis by using a GUI while image data is displayed, a flicker can be prevented in a reliable manner. Further, a flicker can be prevented more properly by setting parameters unique to each image data.

Although in the embodiment, YUV-converted image data is filtered by multiplying it by scaling parameters, the invention is not limited such a case. Another applicable method is to decrease the difference between luminance values and the differences between color difference values of adjacent dots. Or both methods may be used in combination.

Although in the embodiment the flicker preventing section 122 is provided in the set-top box 106 of the Web browsing system 102, it may be provided in the client of any image data display system that consists of a server as the image data transmission side and the client as the receiving device.

The above-described function of the flicker preventing section 122 can be applied to various kinds of apparatuses by writing a computer-executable program of the function on a recording medium such as a magnetic disk, e.g., a floppy disk or a hard disk, an optical disc, e.g., a CD-ROM or a DVD, or a semiconductor memory, or by transmitting such a program via a communication medium. A computer in which the function of the flicker preventing section 122 is implemented executes the above-described process by reading a program recorded on a recording medium and operates under the control of the program.

Consistent with the present invention, there may be added a function of reducing color contrast by increasing or decreasing the values of a luminance signal and two color difference signals obtained from received image data. This makes it possible to darken the image data and make it lighter in color as a whole, whereby preferably flicker can be prevented when displaying the image data.

Consistent with the present invention, there may be added a function of reducing color contrast by decreasing the difference between luminance component values and the differences between color difference component values (there are two color difference components) of adjacent dots of received image data. This makes the image data less distinct in color difference, whereby preferably flicker can be prevented when displaying the image data.

Consistent with the present invention, the parameters used for the flicker preventing process can be set freely by the user for each image data. because they are capable of being set freely by the user, the parameters can reflect the user's taste. And because they are capable of being set for each image data, the parameters allow execution of flicker preventing processes that are suitable for respective image data even in displaying a plurality of image.

Further, consistent with the present invention, parameters can be changed while image data is displayed. When parameters for image data being displayed have been changed, a flicker preventing process is executed by using the changed parameters and resulting image data is displayed again. This makes it possible to execute a flicker preventing process while image data is displayed and evaluated by the user, whereby a flicker can be prevented more properly.

What is claimed is:

1. A device for preventing flicker which occurs when displaying image data, comprising:

a first converter for converting image data into a first set of signals having at least one luminance signal and two color difference signals;

an orthogonal transforming unit for orthogonal transforming said first set of signals;

a high-frequency attenuating unit for attenuating a high-frequency portion of at least one of the orthogonal transformed signals;

an inverse orthogonal transforming unit for inverse orthogonal transforming the high-frequency attenuated set of signals into a second set of signals having at least one luminance signal and two color difference signals; and a second converter for converting the resultant second set of signals into image data for display.

2. The device of claim 1, wherein the high-frequency attenuating unit is responsive to a parameter inputted by a user.

3. The device of claim 1, further comprising a filtering unit for adjusting one of the signals converted by the first converter.

4. The device of claim 3, wherein the filtering unit adjusts the signal on the basis of a parameter inputted by a user.

5. The device of claim 3, wherein the filtering unit reduces a difference of values of the first set of signals representing adjacent dots of the image data.

6. The device of claim 1, wherein the device is incorporated in a display device for displaying image data received from a data server.

7. The device of claim 6, wherein the display device displays the image data according to an interlace scheme.

8. The device of claim 6, wherein:

the high-frequency attenuating unit attenuates the high-frequency portion of the first set of signals on the basis of parameters regarding each signal inputted by a user; and the filtering unit adjusts a signal on the basis of a corresponding parameter inputted by the user.

9. The device of claim 8, further comprising a database for storing image data and a corresponding parameter inputted by the user.

10. The device of claim 9, wherein the display device determines, when displaying the image data, if the image data and the corresponding parameter are stored in the database and displays the image data processed using the parameter.

11. The device of claim 10, wherein:

the database stores a default parameter; and the display device displays the image data processed using the default parameter when the image data does not have user-defined parameters stored in the database for this image.

12. A method for preventing flicker that occurs when displaying image data;

converting image data into a first set of signals having at least one luminance signal and two color difference signals;

orthogonal transforming said first set of signals;

attenuating a high-frequency portion:of at least one of the orthogonal transformed signals;

inverse orthogonal transforming the high-frequency attenuated set of signals into a second set of signals having at least one luminance signal and two color difference signals; and converting the resultant second set of signals into image data for display.

13. The method of claim 12, wherein the step of attenuating a high-frequency portion includes the substep of responding to a parameter inputted by a user.

14. The method of claim 12, further comprising the step of adjusting one of the signals in said first set of signals.

15. The method of claim 14, wherein the step of adjusting includes the substep of responding to a parameter inputted by user.

16. The method of claim 14, wherein the step of adjusting includes the substep of reducing a difference of values between adjacent dots of the image data of the first set of signals.

17. The method of claim 12, further comprising the step of receiving the image data from a data server.

18. The method of claim 17, wherein the step of attenuating a high-frequency portion includes the substep of responding to a parameter inputted by a user; and the step of adjusting includes the substep of responding to said parameter inputted by the user.

19. The method of claim 18, further comprising the step of storing image data with said corresponding parameter inputted by the user into a database.

20. The method of claim 19, further comprising the step of determining if the image data and said corresponding parameter are stored in the database; and displaying the image data after responding to said parameter.

21. The device of claim 20, further comprising the step of storing a default parameter in the database; and displaying the image data after responding to processing using the default parameter when the image data does not have user-defined parameter stored in the database for this image.

22. A computer-readable memory comprising:

first instruction means for causing a computer to convert image data into a first set of signals having at least one luminance signal and two color difference signals;

second instruction means for causing a computer to orthogonal transform said first set of signals;

third instruction means for causing a computer to attenuate a high-frequency portion of at least one of the orthogonal transformed signals;

fourth instruction means for causing a computer to inverse orthogonal transform the high-frequency attenuated set of signals into a second get of signals having at least one luminance signal and two color difference signals; and fifth instruction means for causing a computer to convert the resultant second set of signals into image data for display.

23. The computer-readable memory, further comprising sixth instruction means for causing a computer to adjust one of the signals in said first set of signals.

* * * * *